April 20, 1965  E. J. FLACK  3,179,433
TOY VEHICLE
Filed Jan. 16, 1964
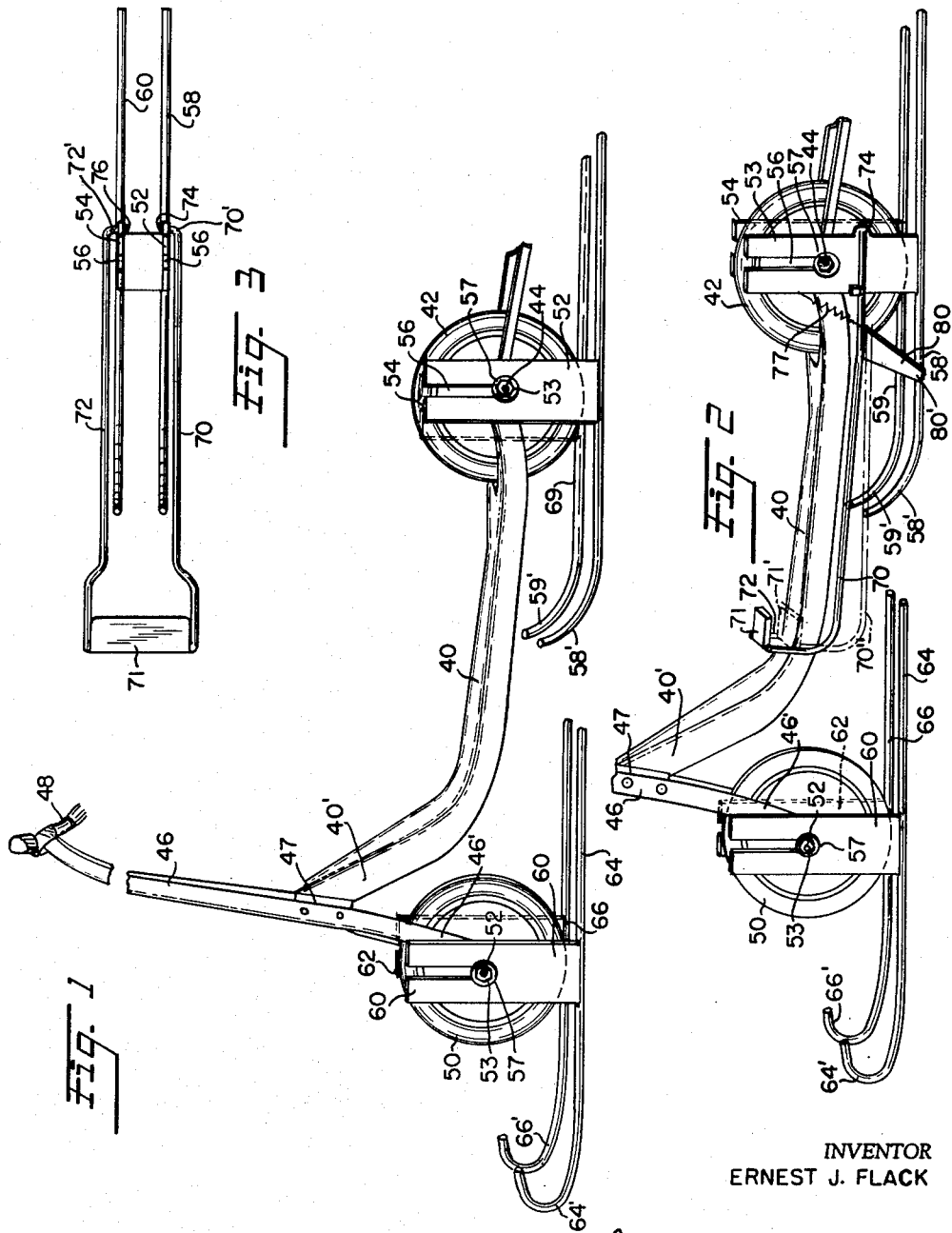
INVENTOR
ERNEST J. FLACK
BY *Wesley Everett*
ATTORNEY

United States Patent Office 3,179,433
Patented Apr. 20, 1965

3,179,433
TOY VEHICLE
Ernest J. Flack, 905 De Soto Road, Baltimore, Md.
Filed Jan. 16, 1964, Ser. No. 338,156
2 Claims. (Cl. 280—8)

The present invention relates to a toy runner vehicle similar to the present toy wheel scooter.

The primary object of the invention is to provide a scooter-type vehicle, having one or more runners for using the scooter on ice or snow.

Another object of the invention is to provide a construction that is both economical and practical and one that would require a minimum amount of manufacturing effort.

A further object of the invention is to provide a toy vehicle that will provide a certain amount of skill in its operation.

While several objects of the invention have been pointed out, other objects may present themselves as the nature of the invention is more fully disclosed, consisting of its novel construction, combination and arrangement of its several parts shown in the accompanying drawings forming a part of this specification, and in which:

FIGURE 1 is a view in elevation of a modified form of a double runner vehicle.

FIGURE 2 is a fragmentary view in elevation of the form of vehicle shown in FIGURE 1 in which a breaking mechanism is shown associated therewith.

FIGURE 3 is a plan view of the breaking mechanism.

In describing the invention like numerals are used to indicate like and similar parts throughout the several views.

The invention comprises a double runner type toy vehicle associated with a wheeled scooter. The scooter is shown with a support 40 upon which the operator or rider stands. At the rear of the support 40 is a wheel 42 rotatably mounted on an axle 44 which is fixed in position relative to the support 40. At the front end of the support 40 there is an upright standard 46, which is hinged at 47 for turning the standard either right or left by the handle 48 positioned at the upper end of the standard. At the lower end 46′ of the standard there is rotatably mounted a wheel 50 on the axle 52. It will be noted that one pair of runners is attached to the axle 52 of the hinged upright standard 46 of the scooter, and a second pair of runners is attached to the axle 44 adjacent the rear of the vehicle.

Secured to each side of the rear axle 44 are plates 53 and 54. These plates are preferably slotted, as shown at 56, in order that they may be vertically adjusted however, they may only be provided with a hole to accommodate the axle 44. The axle is also preferably provided with a large washer 47 in order to tightly secure the plates in position by tightening the nuts 53. Secured to the bottom of the plates 53 and 54 are runners 58 and 59 adapted to extend horizontally to the supporting surface. The runners 58 and 59 are slightly arched at their forward ends, as shown by the numerals 58′ and 59′. The forward end 40′ of the support 40, as stated before, is hingedly connected to the vertical standard 46 by the hinge 47. Secured to the axle 52 at the lower end 46′ of the standard 46 are a pair of plates 60 and 62, similar to plates 53 and 54. Secured to the bottom of the plates 60 and 62 are runners 64 and 66 adapted to be positioned horizontally with the supporting surface similar to the runners 58 and 59. The forward end of the runners 64′ and 66′ are arched upwardly similar to runners 58 and 59 to prevent the runners from engaging small objects etc. lying close to the surface over which the vehicle is passing.

Any one of the forms shown may be provided with a brake. However, the brake is only illustrated in the form of the invention shown in FIGURE 6.

The brake comprises at least one arm, but is shown with two arms 70 and 72 extending horizontally along and adjacent the horizontal support 40. The forward end may either extend over the upper surface of the support 40, or it may be provided with a treadle plate 71 conveniently located to be operated by the foot of the rider. The rear ends 70′ and 72′ of the arms 70 and 72 are hingedly connected to the plates 53 and 54 at 74 and 76. The arms as shown by full lines are normally held in an upward position by a tension spring 77 and are depressible to the position as illustrated by the dotted line 70′ as shown in FIGURE 6 when the treadle is depressed to the position shown at 71″. Secured to the arms 70 and 72 are downwardly extended elements, illustrated by the numeral 80. The lower end 80′ of these elements by the action of the tension spring are normally carried above the plane of the lower surface of the runner and out of contact with the surface supporting the vehicle. When it is desirable to apply the brake, the treadle 71 is depressed against the tension of the spring 77. This causes the lower end 80′ of the member 80 to move downwardly below the plane of the lower surface of the runner and engage the surface over which the vehicle is traveling for retarding the movement of the vehicle.

While the invention has been shown and described in several forms it is not intended to be a limitation and the scope of the invention is best defined in the appended claims.

I claim:

1. A stand-up toy scooter-like vehicle comprising in combination:
   (a) a longitudianl horizontal support of such width as to support the foot of a rider;
   (b) a supporting wheel positioned at one end of the horizontal support on a fixed axle perpendicular to the horizontal support and extending below the plane of the horizontal support;
   (c) a vertical steering and supporting element positioned at the opposite end of the horizontal support and hingedly connected thereto, having a steering handle at the upper end thereof, and a wheel supported at the lower end, the wheel being supported on an axle parallel with the axle supporting the first mentioned wheel and extending below the plane of the horizontal support;
   (d) a pair of removable runners secured to the respective axles at each side of each wheel, the runners extending substantially parallel with the horizontal support and adapted to support the vehicle upon a supporting surface;
   (e) each runner having a bracket located substantially centrally of the runner and extending upwardly from the upper surface thereof, the brackets having means for engaging the axle at each side of each wheel and at greater distance from the runner than the wheel diameter, thereby raising the wheels free of the supporting surface.

2. In a stand-up toy scooter-like vehicle combination as claimed in claim 1 wherein one of the brackets is provided with a brake arm, having one end pivotally connected to the bracket and the opposite end extending over the horizontal support, and adapted to be moved through a small arc, tension means associated with the arm for normally holding the arm in an upwardly position, the arm having a supporting surface engaging means extending downwardly therefrom, the lower end of the surface engaging means being of such length as to be positioned above the horizontal plane of the under surface of the runner when the arm is in an upward position and below the said plane when the end of the arm extending over the horizontal support is in a downward position.

References Cited by the Examiner

UNITED STATES PATENTS

| | | | |
|---|---|---|---|
| 1,349,311 | 8/20 | Ashman | 280—8 |
| 1,483,183 | 2/24 | Lindberg | 280—16 |
| 2,487,173 | 11/49 | Peterson | 280—23 |

FOREIGN PATENTS 230,754    2/11    Germany.

ARTHUR L. LA POINT, *Primary Examiner.*